US 11,248,911 B2

(12) United States Patent
Hu et al.

(10) Patent No.: US 11,248,911 B2
(45) Date of Patent: Feb. 15, 2022

(54) METHOD AND DEVICE FOR ALIGNING COORDINATE OF POSITION DEVICE WITH COORDINATE OF IMU

(71) Applicant: GUANGDONG VIRTUAL REALITY TECHNOLOGY CO., LTD., Shenzhen (CN)

(72) Inventors: Yongtao Hu, Shenzhen (CN); Jingwen Dai, Shenzhen (CN); Jie He, Shenzhen (CN)

(73) Assignee: GUANGDONG VIRTUAL REALITY TECHNOLOGY CO., LTD., Shenzhen (CN)

( * ) Notice: Subject to any disclaimer, the term of this patent is extended or adjusted under 35 U.S.C. 154(b) by 697 days.

(21) Appl. No.: 16/236,478

(22) Filed: Dec. 29, 2018

(65) Prior Publication Data

US 2019/0137276 A1 May 9, 2019

Related U.S. Application Data

(63) Continuation of application No. PCT/CN2017/096314, filed on Aug. 7, 2017.

(30) Foreign Application Priority Data

Apr. 24, 2017 (CN) .......................... 201710273572.0

(51) Int. Cl.
*G01C 21/18* (2006.01)
*G06F 3/01* (2006.01)

(52) U.S. Cl.
CPC .............. *G01C 21/18* (2013.01); *G06F 3/011* (2013.01); *G06F 3/012* (2013.01); *G06F 3/014* (2013.01)

(58) Field of Classification Search
CPC ......... G01C 21/18; G06F 3/011; G06F 3/012; G06F 3/014
See application file for complete search history.

(56) References Cited

U.S. PATENT DOCUMENTS

| 2006/0284979 | A1 | 12/2006 | Clarkson |
| 2017/0045736 | A1* | 2/2017 | Fu ......................... G02B 27/017 |
| 2018/0096534 | A1* | 4/2018 | Kezele .................. G06T 19/006 |

FOREIGN PATENT DOCUMENTS

| CN | 103994765 A | 8/2014 |
| CN | 105698765 A | 6/2016 |
| CN | 105751230 A | 7/2016 |
| CN | 106197407 A | 12/2016 |
| WO | 2018/196224 A1 | 11/2018 |

\* cited by examiner

*Primary Examiner* — Natalie Huls
*Assistant Examiner* — Cynthia L. Davis

(57) ABSTRACT

An alignment method is provided. A first 3D position and a first IMU calculation 3D position of a position object with an IMU is determined when the IMU enters a steady state. A second 3D position and a second IMU calculation 3D position of the position object is determined when the IMU exits the steady state. A first relative vector is determined based on the first 3D position and the second 3D position. A second relative vector is determined based on the first IMU calculation 3D position and the second IMU calculation 3D position. A rotation matrix is determined based on the first relative vector and the second first relative vector. A coordinate system of the position device is aligned with a coordinate system of the IMU based on the rotation matrix. An electronic device and a non-transitory computer readable storage medium are also provided.

20 Claims, 4 Drawing Sheets ional Appli-
METHOD AND DEVICE FOR ALIGNING COORDINATE OF POSITION DEVICE WITH COORDINATE OF IMU

CROSS-REFERENCE TO RELATED APPLICATIONS

This Application is a continuation of International Application No. PCT/CN2017/096314, entitled "ALIGNMENT METHOD AND ALIGNMENT DEVICE" filed on Aug. 7, 2017, which claims benefit of Chinese patent application No. 201710273572.0 filed on Apr. 24, 2017, and both of which are incorporated by reference herein in its entirety for all purposes.

TECHNICAL FIELD

The present disclosure relates to the field of virtual reality, mixed reality, and/or augmented reality in general. More particularly, and without limitation, the disclosed embodiments relate to an alignment method and an electronic device.

BACKGROUND

Currently, in the disclosure contexts of virtual reality (VR), augmented reality (AR), and mixed reality (MR), multiples are applied to the disclosure contexts by information integration to improve user experience. In particular, information integration between a position device and an inertial measurement unit (IMU) is becoming more and more common. Wherein, IMU is a device for measuring Euler angles (or angular velocities) and acceleration of an object. The IMU includes gyroscope, accelerometer, and magnetometer. The information integration of position device and IMU helps to obtain the pose information of a position object in the positioning system, and further realize the function of recentering the position object in the positioning system. The IMU information with high frame rate can compensate for the positioning system with low frame rate. Thus, the position information may be output with a high frame rate, and the fluency of positioning and the user perception can be improved. There are several methods for aligning the positioning system with the IMU may include as follows currently.

1. Aligning Relies on Hardware.

For example, the position device and the IMU of a Visual-Inertial Odometry (VIO) are rigidly bound together. However, it requires high hardware process quality for the hardware, and limits application scenarios, and the positioning system cannot be separated from the IMU.

2. Combining Multiple Position Objects to Speculate Pose.

For example, there are multiple position objects on a controller, such as a rigid body marker of OptiTrack, a hand controller of HTC Vive, a controller of Oculus Rift, or the like, wherein OptiTrack is a motion capture studio of creating desktop applications easily of full body motion capture system, and HTC Vive is a VR virtual reality headset display product developed by HTC and Valve. The position objects can be light spots or a plurality of infrared receivers. In theory, the pose of position objects can be derived based on rigid body properties of the multiple objects, and the alignment relationship between the IMU and the controller can be derived based on a corresponding pose relationship of the controller and the IMU when mounted. However, it requires high hardware process quality for the hardware, and limits the structural design when combines multiple position objects, and the price increases exponentially.

SUMMARY

Embodiments of the present disclosure provide an alignment method, an electronic device and a non-transitory computer readable storage medium for reducing hardware process requirements and reducing costs.

In a first aspect, an alignment method is provided in accordance with an embodiment of the present disclosure. A first 3D position and a first IMU calculation 3D position of a position object with an IMU are determined when an IMU enters a steady state. A second 3D position and a second IMU calculation 3D position of the position object are determined when the IMU exits the steady state. The first 3D position and the second 3D position are determined by a position device; the first IMU calculation 3D position and the second IMU calculation 3D position are determined by the IMU. A first relative vector is determined based on the first 3D position and the second 3D position. A second relative vector is determined based on the first IMU calculation 3D position and the second IMU calculation 3D position. A rotation matrix is determined based on the first relative vector and the second first relative vector. A coordinate system of the position device is aligned with a coordinate system of the IMU based on the rotation matrix.

In a second aspect, an electronic device is provided. The alignment device includes one or more processors and memory storing one or more programs configured to be executed by the one or more processors, the one or more programs include instructions for: determining a first 3D position and a first inertial measurement unit (IMU) calculation 3D position of a position object with an IMU when the IMU enters into a steady state; determining a second 3D position and a second IMU calculation 3D position of the position object when the IMU exits the steady state; wherein the first 3D position and the second 3D position are determined by a position device; the first IMU calculation 3D position and the second IMU calculation 3D position are determined by the IMU; determining a first relative vector based on the first 3D position and the second 3D position; determining a second relative vector based on the first IMU calculation 3D position and the second IMU calculation 3D position; determining a rotation matrix based on the first relative vector and the second first relative vector; and aligning a coordinate system of the position device with a coordinate system of the IMU based on the rotation matrix.

In a third aspect, a non-transitory computer readable storage medium is provided. The non-transitory computer readable storage medium storing one or more programs configured to be executed by one or more processors of an electronic device, the one or more programs include instruction for: determining a first 3D position and a first inertial measurement unit (IMU) calculation 3D position of a position object with an IMU when the IMU enters into a steady state; determining a second 3D position and a second IMU calculation 3D position of the position object when the IMU exits the steady state; wherein the first 3D position and the second 3D position are determined by a position device; the first IMU calculation 3D position and the second IMU calculation 3D position are determined by the IMU; determining a first relative vector based on the first 3D position and the second 3D position; determining a second relative vector based on the first IMU calculation 3D position and the second IMU calculation 3D position; determining a rotation matrix based on the first relative vector and the second first relative vector; and aligning a coordinate system of the position device with a coordinate system of the IMU based on the rotation matrix.

DETAILED DESCRIPTION OF EMBODIMENTS

Embodiments of the present disclosure provide an alignment method and an alignment device for calculating a rotation matrix, thereby a position device and an inertial measurement unit (IMU) can be aligned with each other, and a process requirements for hardware and the cost can be reduced.

The words "three-dimensional (3D)", "three dimension (3D)" in the specification and claims of the present disclosure may refer an adjective meaning that existing in three dimensions, and/or having depth as well as height and width. For example, the words "3D space (also: 3-space or, rarely, tri-dimensional space)" is a geometric setting in which three values (called parameters) are required to determine the position of an object (i.e., point). In mathematics, analytic geometry (also called Cartesian geometry) describes every point in three-dimensional space by means of three coordinates. Three coordinate axes are given, each perpendicular to the other two at the origin, the point at which they cross. They are usually labeled x, y, and z. Relative to these axes, the position of any point in 3D space is given by an ordered triple of real numbers, each number giving the distance of that point from the origin measured along the given axis, which is equal to the distance of that point from the plane determined by the other two axes. The words "3D position" in the specification and claims of the present disclosure may refer a position of an object in 3D space which can be defined by three coordinate axes.

The words "first", "second", "third", "fourth", etc. (if present) in the specification and claims of the present disclosure and the above figures are configured to distinguish similar objects but not to describe a specific order. It is to be understood that the data so configured may be interchanged where appropriate, so that the embodiments described herein can be implemented in a sequence other than what is illustrated or described herein. In addition, the words "comprise" and "include" are intended to cover a non-exclusive inclusion, for example, a process, method, system, product, or device that includes a series of steps or units is not necessarily limited to those steps or units may include other steps or units not explicitly listed or inherent to such processes, methods, products or devices.

Figure 1:
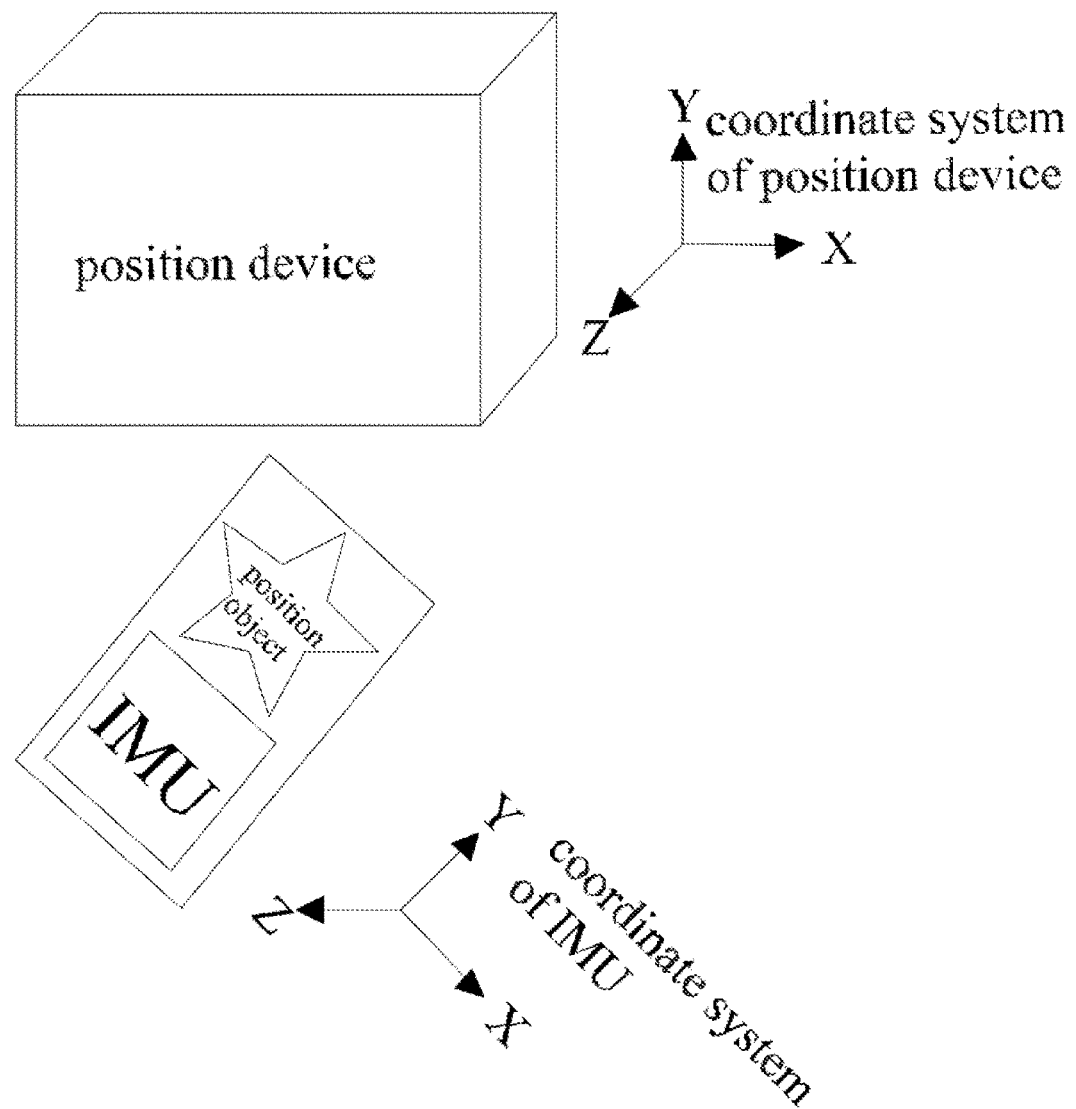
FIG. 1 illustrates a schematic view of an application scenario of a position device and IMU, in accordance with an embodiment of the present disclosure.

As illustrated in FIG. 1, an embodiment of the present disclosure can be configured to determine a rotation matrix, that is, the embodiment of the present disclosure is configured to align the coordinate system of the position device with the coordinate system of the IMU. The present disclosure can be applied to the position devices having a function of 3D position tracking, in which a position object and IMU can be rigidly coupled to each other, and in which the position device (for example, a binocular camera, an Optitrack infrared combination camera, an HTC vice infrared base, or the like) should be maintained in a standstill position. The present disclosure can be applied to other devices that meet the above requirements, and those devices are not limited.

Figure 2:
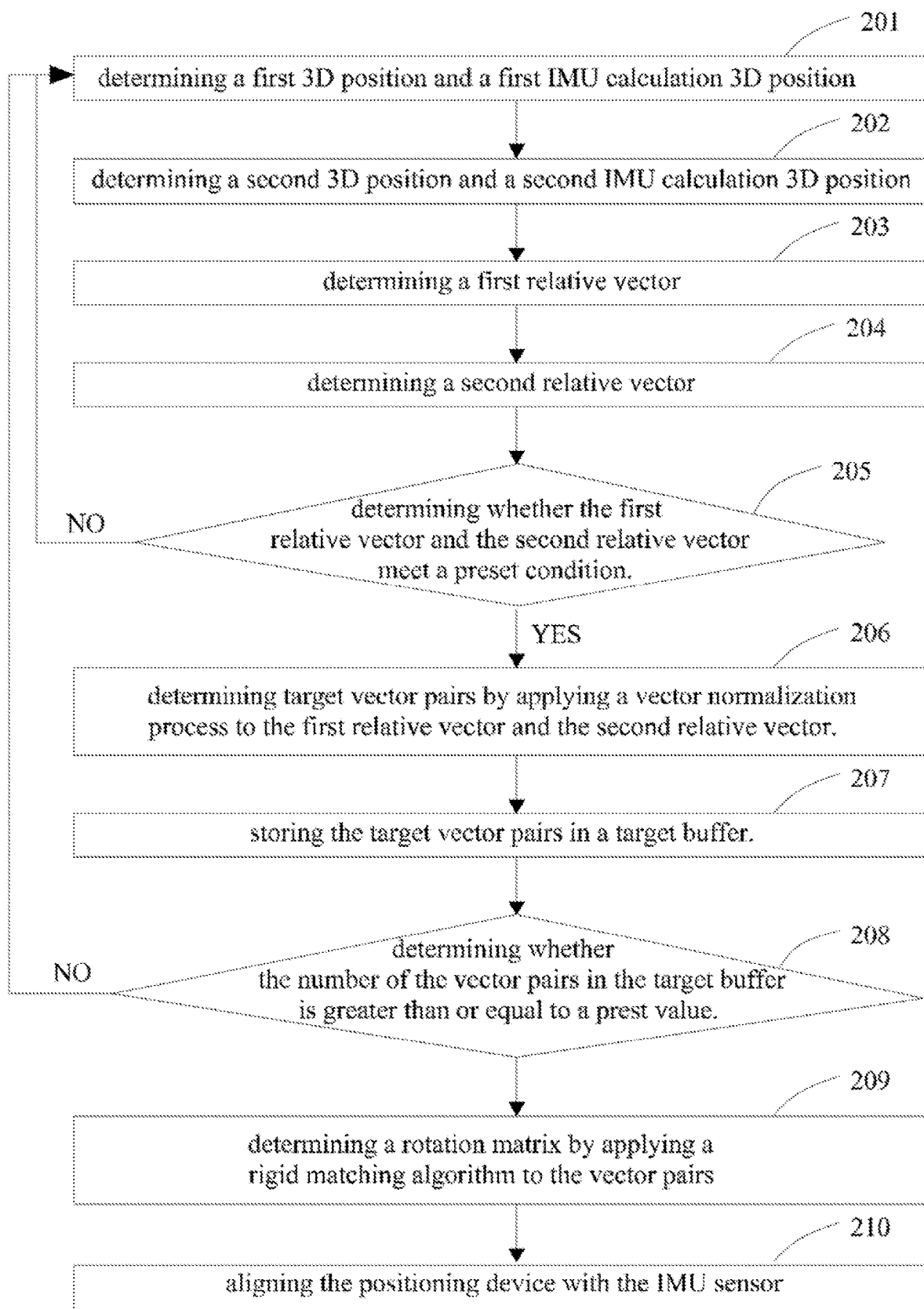
FIG. 2 illustrates a schematic view of an alignment method, in accordance with an embodiment of the present disclosure.

As illustrated in FIG. 2, an alignment method of an embodiment of the present disclosure may begin at block 201.

At block 201, a first 3D position and a first IMU calculation 3D position of a position object can be determined when the IMU of the position object enters a steady state.

In some embodiments, it can determine whether the IMU enters into the steady state when the alignment device needs to determine the rotation matrix, in other words, when the alignment device needs to align the coordinate system of the position device with the coordinate system of the IMU. A first 3D position information of the position object and a first IMU information can be collected when the IMU enters the steady state. The first 3D position can be determined based on the first 3D position information, and the first IMU calculation 3D position can be determined based on the first IMU information. The steady state can be considered as a state in which a signal of the IMU does not change or changes slowly with time. The first 3D position information is the 3D position information of the position object collected by the position device when the IMU enters the steady state. The first IMU information is the information collected by the IMU when the IMU enters the steady state.

In one embodiment, the first IMU calculation 3D position can be determined by performing integrated acceleration on the first IMU information. In some embodiments, other calculation methods can be applied, which is not limited herein.

In one embodiment, the IMU can be determined whether it enters the steady state by the following means. For example, the IMU can be determined whether it enters the steady state comprehensively based on change of the IMU information over a period of time, or based on whether a difference between two yaw values, a difference between two pitch values, and/or a difference between two roll values of the IMU of any two frames are/is less than respective preset thresholds/threshold.

The last one is taken as an example may include the followings, wherein, "yaw" represents a heading direction, which an object is rotated around a Y axis; "roll" represents a rolling direction, which an object is rotated around a Z axis; "pitch" represents a pitch direction, which an object is rotated around an X axis.

A difference between two yaw values of the IMU of any two frames can be acquired, the difference between two yaw values can be determined whether it is less than a first preset threshold, the IMU is considered to enter into the steady state when the difference between two yaw values is less than the first preset threshold; and/or, a difference between two pitch values of the IMU of any two frames can be acquired, the difference between two pitch values can be determined whether it is less than a second preset threshold, the IMU is considered to enter into the steady state when the difference between two pitch values is less than the second preset threshold; and/or, a difference between two roll values of the IMU of any two frames can be acquired, the difference between two roll values can be determined whether it is less than a third preset threshold, the IMU is considered to enter into the steady state when the difference between two roll values is less than the third preset threshold.

In some embodiments, the IMU can be determined whether it enters the steady state based on the difference between the two yaw values, the difference between the two pitch values, and/or the difference between the two roll values of the IMU of any two frames, and the two frames may be two adjacent frames, or two non-adjacent frames, there is no limit herein.

At block 202, a second 3D position and a second IMU calculation 3D position of the position object can be determined when the IMU of the position object exits the steady state.

In some embodiments, the alignment device can be capable of determining whether the IMU exits the steady state. A second 3D position information of the position object and a second IMU information can be collected when the IMU exits the steady state. The second 3D position can be determined based on the second 3D position information. The second IMU calculation 3D position can be determined based on the second IMU information. The second 3D position information is the 3D position information of the position object collected by the position device when the IMU exits the steady state. The second IMU information is the information collected by the IMU when the IMU exits the steady state. The second 3D position is a 3D position of the position object based on a 3D position information of the position object collected by the position device when the IMU exits the steady state. The second IMU calculation 3D position is a 3D position of the position object based on the information collected by the IMU when the IMU exits the steady state.

In one embodiment, the second IMU calculation 3D position can be determined by performing integrated acceleration on the first IMU information. In some embodiments, other calculation methods can be applied, which is not limited herein.

In some embodiments, the IMU can be determined whether it exits the steady state by the following means. For example, the IMU can be determined whether it enters the steady state comprehensively based on change of the IMU information over a period of time, or based on whether a difference between two yaw values, a difference between two pitch values, and/or a difference between two roll values of the IMU of any two frames are/is greater than respective preset thresholds/threshold. When the difference between the two yaw values, the difference between the two pitch values, and/or the difference between the two roll values of the IMU of any two frames are/is greater than the respective preset thresholds/threshold, the IMU may be considered to exit the steady state. Here the determination method is similar to that of determining whether the IMU enters the steady state at block 201, it is not repeated in the specification.

At block 203, a first relative vector can be determined based on the first 3D position and the second 3D position.

In some embodiments, the alignment device may determine the first relative vector based on the first 3D position and the second 3D position when the first 3D position and the second 3D position of the position object are determined. The first relative vector is a vector between the first 3D position and the second 3D position. In other words, the first relative vector is a vector defined by the first 3D position and the second 3D position. For example, a 3D position (i.e., the first 3D position) of the position object is located at position A when the IMU enters a steady state, a 3D position (i.e., the second 3D position) of the position object is located at position B when the IMU exits the steady state, the first relative vector is the vector between the position A and the position B. In some embodiment, the first relative vector may be from the position A to the position B, and the first relative vector can be defined by the following equation:

$$\vec{AB}=B-A, \text{wherein}$$

$\vec{AB}$ refers to the first relative vector;
B refers to the three coordinates of the second 3D position; and
A refers to the three coordinates of the first 3D position.

At block 204, a second relative vector can be determined based on the first IMU calculation 3D position and the second IMU calculation 3D position.

In some embodiments, the alignment device may determine the second relative vector based on the first IMU calculation 3D position and the second IMU calculation 3D position when the first IMU calculation 3D position and the second IMU calculation 3D position are determined. The second relative vector is a vector between the first IMU calculation 3D position and the second IMU calculation 3D position. In other words, the second relative vector is a vector defined by the first IMU calculation 3D position and the second IMU calculation 3D position. For example, a 3D position (i.e., the first IMU calculation 3D position) of the position object is located at a position A when the IMU enters into a steady state, a 3D position (i.e., the second IMU calculation 3D position) of the position object is located at a position B when the IMU exits the steady state, the second relative vector is the distance between the position A and the position B. In some embodiment, the second relative vector may be from the position A to the position B, and the second relative vector can be defined by the following equation:

$$\vec{AB}=B-A, \text{wherein}$$

$\vec{AB}$ refers to the second relative vector;
B refers to the three coordinates of the second IMU calculation 3D position; and
A refers to the three coordinates of the first IMU calculation 3D position.

At block 205, the first relative vector and the second relative vector can be determined whether they meet preset condition. Block 206 can be executed when the first relative vector and the second relative vector meet the preset condition. When the first relative vector and the second relative vector don't meet the preset condition, the block 201 to block 205 can be executed repeatedly until the first relative vector and the second relative vector meet the preset condition.

In some embodiments, the alignment device is capable of determining whether the first relative vector and the second relative vector meet the preset condition. In some embodiment, the alignment device is capable of determining whether a length of the first relative vector is greater than a fourth preset threshold, and determining whether a length of the second relative vector is greater than a fifth preset threshold. The first relative vector and the second relative vector are considered to meet the preset condition when the length of the first relative vector is greater than the fourth preset threshold and the length of the second relative vector is greater than the fifth preset threshold. When the first relative vector and the second relative vector meet the preset condition, the block 206 is executed. When the length of the first relative vector is less than or equal to the fourth preset threshold and/or the length of the second relative vector is less than or equal to the fifth preset threshold, the block 201 to block 205 are executed repeatedly until the first relative vector and the first the second relative vectors meet the preset condition.

At block 206, a vector normalization process can be applied to the first relative vector and the second relative vector, to acquire a plurality of target vector pairs.

In some embodiments, the alignment device may apply the vector normalization process to the first relative vector and the second relative vector to acquire a plurality of target vector pairs after obtaining the first relative vector and the second relative vector that meet the preset condition.

At block 207, the target vector pairs can be stored in a target buffer.

In some embodiments, the alignment device may store the target vector pairs obtained at the block 206 in the target buffer.

At block 208, the number of the target vector pairs in the target buffer can be determined whether it is greater than or equal to a preset value. The block 209 is executed when the number of the target vector pairs in the target buffer is greater than or equal to the preset value. When the number of the target vector pairs in the target buffer is less than the preset value, the blocks 201 to 208 are executed repeatedly until the number of the target vector pairs in the target buffer is greater than or equal to the preset value.

In some embodiments, the alignment device may determine whether the number of the target vector pairs in the target buffer is greater than or equal to the preset value, for example, whether the number of the target vector pairs in the target buffer is a positive integer that greater than or equal to 1. The block 209 is executed when the target vector pairs in the target buffer is greater than or equal to the preset value. The blocks 201 to 208 are repeatedly executed when the target vector pairs in the target buffer is less than the preset value until the number of the target vector pairs in the target buffer is greater than or equal to the preset value.

At block 209, a rotation matrix can be determined by applying a rigid matching algorithm to all the target vector pairs in the target buffer.

In some embodiments, the alignment device may determine all the target vector pairs in the target buffer with a rigid matching algorithm (e.g. Umeyaman algorithm) to determine a rotation matrix when the number of the target vector pairs in the target buffer is greater than or equal to the preset value.

At block 210, the position device can be aligned with the IMU based on the rotation matrix.

In some embodiments, because the rotation matrix is a rotation relationship between the coordinate system of the position device and the coordinate system of the IMU, the alignment device can align the coordinate system of the position device with the coordinate system of the IMU based on the rotation matrix after the alignment device obtains the rotation matrix. So that the position device is aligned with the IMU.

In conclusion, it can be seen that the rotation matrix is determined by applying the rigid matching algorithm to all the target vector pairs in the target buffer. The rotation matrix can ensure that the position device and the IMU are arranged in a same orientation and along a same direction. That is, the position device can be aligned with the IMU without hardware and only by a procedure. Therefore, the hardware process requirements are lowered. Furthermore, because the rotation matrix is obtained based on the 3D position and the IMU calculation 3D position of the position object when the IMU enters the steady state and exits the steady state, in addition, because the target vector pairs are determined by applying vector normalization process to the first relative vector and the second relative vector of one position object, and the target vector pairs are stored in the target buffer. When the number of the target vector pairs in the target buffer is greater than the preset value, the rigid matching algorithm is applied to all the target vector pairs in the target buffer to determine the rotation matrix. Therefore, only one position object is needed, and there is no need to provide multiple position objects binding to each other, which reduces the hardware process requirements and cost.

The above embodiments of the present disclosure are described from a perspective of the alignment method, and other embodiments of the present disclosure are described below from a perspective of the alignment device.

Figure 3:
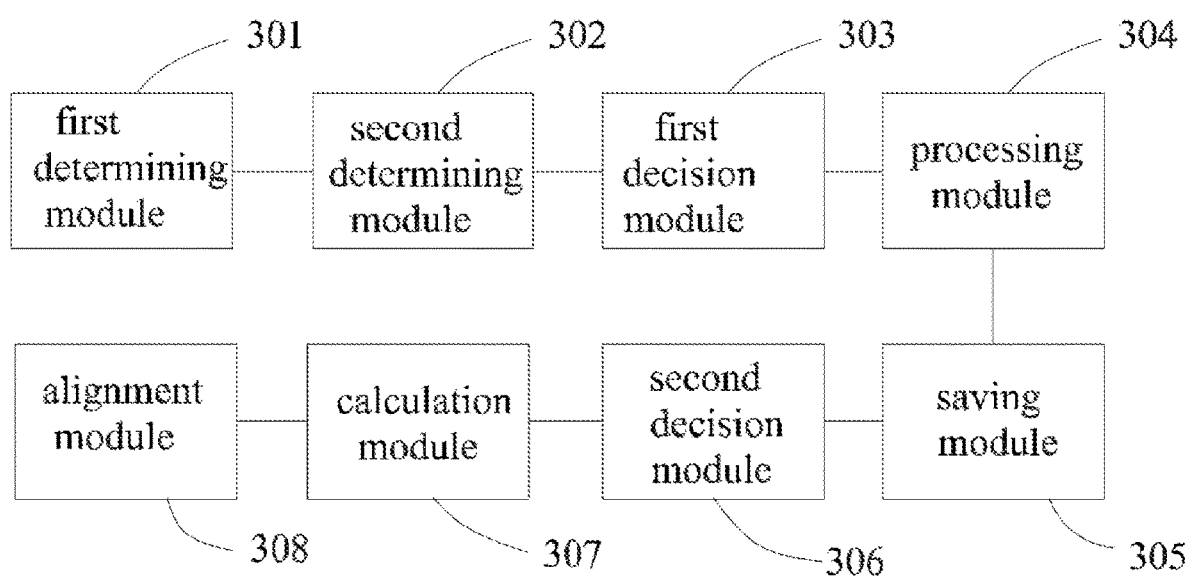
FIG. 3 illustrates a schematic view of an alignment device, in accordance with an embodiment of the present disclosure.

As illustrated in FIG. 3, FIG. 3 illustrates a schematic view of an embodiment of an alignment device, in accordance with an embodiment of the present disclosure. The alignment device can include a first determining module 301, a second determining module 302, a first decision module 303, a processing module 304, a storing module 305, a second decision module 306, a calculation module 307, and an alignment module 308.

The first determining module 301 can be configured to determine a first 3D position and a first IMU calculation 3D position of the position object when the IMU enters the steady state. The first 3D position is a 3D position of the position object based on the 3D position information of the position object, wherein the 3D position information is collected by the position device when the IMU enters the steady state. The first IMU calculation 3D position is a 3D position of the position object based on the information collected by the IMU when the IMU enters the steady state.

The first determining module 301 can be further configured to determine a second 3D position and a second IMU calculation 3D position of the position object when the IMU exits a steady state. The second 3D position is a 3D position of the position object based on the 3D position information of the position object, wherein the 3D position information is collected by the positioning device when the IMU exits the steady state. The second IMU calculation 3D position is a 3D position of the position object based on the information collected by the IMU when the IMU exits the steady state.

The second determining module 302 can be configured to determine a first relative vector based on the first 3D position and the second 3D position. The first relative vector is a vector between the first 3D position and the second 3D position.

The second determining module 302 can be further configured to determine a second relative vector based on the first IMU calculation 3D position and the second IMU calculation 3D position. The second relative vector is a vector between the first IMU calculation 3D position and the second IMU calculation 3D position.

The first decision module 303 can be configured to determine whether the first relative vector and the second relative vector meet a preset condition.

The processing module 304 can be configured to apply a vector normalization process to the first relative vector and the second relative vector to acquire a plurality of target vector pairs when the first relative vector and the second relative vector meet the preset condition.

The storing module 305 can be configured to store the target vector pairs in a target buffer.

The second decision module 306 can be configured to determine whether the number of the target vector pairs in the target buffer is greater than or equal to a preset value.

The calculation module 307 can be configured to determine a rotation matrix by applying a rigid matching algorithm to all the target vector pairs in the target buffer when the number of the target vector pairs in the target buffer is greater than or equal to the preset value.

The alignment module 308 can be configured to align the position device with the IMU based on the rotation matrix.

For ease of understanding, a detailed description will be provided below in combination with FIG. 4.

Figure 4:
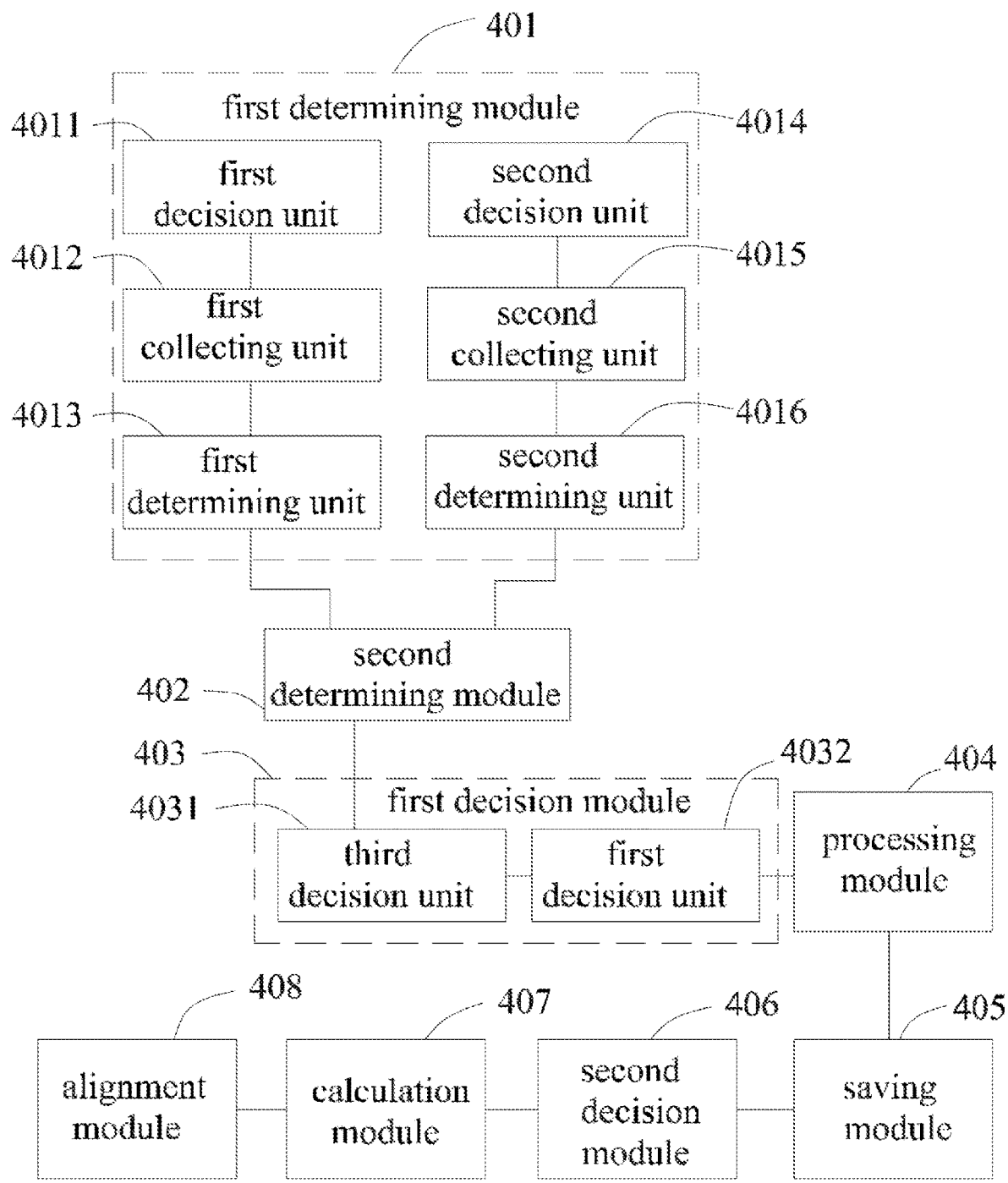
FIG. 4 illustrates a schematic view of an alignment device, in accordance with another embodiment of the present disclosure.

As illustrated in FIG. 4, in accordance with still another embodiment of the present disclosure, the aligning device can include a first determining module 401, a second determining module 402, a first decision module 404, a processing module 404, a storing module 405, a second decision module 406, a calculation module 407, and an alignment module 408.

The first determining module 401 can be configured to determine the first 3D position and the first IMU calculation 3D position of the position object when the IMU enters the steady state. The first 3D position is a 3D position of the position object based on the 3D position information of the position object, wherein the 3D position information is collected by the position device when the IMU enters the steady state. The first IMU calculation 3D position is a 3D position of the position object based on the information collected by the IMU when the IMU enters the steady state.

The first determining module 401 can be further configured to determine the second 3D position and the second IMU calculation 3D position of the position object when the IMU exits the steady state. The second 3D position is a 3D position of the position object based on a 3D position information of the position object wherein the 3D position information is collected by the positioning device when the IMU exits the steady state. The second IMU calculation 3D position is a 3D position of the position object based on the information collected by the IMU when the IMU exits the steady state.

The second determining module 402 can be configured to determine the first relative vector based on the first 3D position and the second 3D position. The first relative vector is a vector between the first 3D position and the second 3D position.

The second determining module 402 can be further configured to determine the second relative vector based on the first IMU calculation 3D position and the second IMU calculation 3D position information. The second relative vector is a vector between the first IMU calculation 3D position and the second IMU calculation 3D position.

The first decision module 403 can be configured to determine whether the first relative vector and the second relative vector meet the preset condition.

The processing module 404 can be configured to apply a vector normalization process to the first relative vector and the second relative vector to acquire a plurality of target vector pairs when the first relative vector and the second relative vector meet the preset condition.

The storing module 405 can be configured to store the target vector pairs are to a target buffer.

The second decision module 406 can be configured to determine whether an amount of the target vector pairs in the target buffer is greater than or equal to a preset value.

The calculation module 407 can be configured to determine a rotation matrix by applying a rigid matching algorithm to all the target vector pairs in the target buffer when the number of the target vector pairs in the target buffer is greater than or equal to the preset value.

The alignment module 408 can be configured to align the position device with the IMU based on the rotation matrix.

The first determining module 401 can include a first decision unit 4011, a first collecting unit 4012, and a first determining unit 4013.

The first decision unit 4011 can be configured to determine whether the IMU enters the steady state.

The first collecting unit 4012 can be configured to collect the first 3D position information and the first IMU information of the position object when the IMU enters the steady state. The first 3D position information is a 3D position information of the position object, wherein the 3D position information is collected by the position device when the IMU enters the steady state. The first IMU information is the information collected by the IMU when the IMU enters a steady state.

The first determining unit 4013 can be configured to determine the first 3D position based on the first 3D position information.

The first determining unit 4013 can be further configured to determine the first IMU calculation 3D position based on the first IMU information.

The first decision unit 4011 cam be further configured to:
acquire the difference between two yaw values of the IMU of any two frames;
determine whether the difference between two yaw values of the IMU of any two frames is less than a first preset threshold; and
determine the IMU enters the steady state when the difference between two yaw values of the IMU of any two frames is less than the first preset threshold;
and/or,
acquire the difference between two pitch values of the IMU of any two frames;
determine whether the difference between two pitch values of the IMU of any two frames is less than a second preset threshold; and
determine the IMU enters the steady state when the difference between two pitch values of the IMU of any two frames is less than the second preset threshold;
and/or,
acquire the difference between two roll values of the IMU of any two frames;
determine whether the difference between two roll values of the IMU of any two frames is less than a third preset threshold; and
determine the IMU enters the steady state when the difference between two roll values of the IMU of any two frames is less than the third preset threshold;

In another embodiment of the present disclosure, the first decision module 401 can further includes a second decision unit 4014, a second collecting unit 4015, and a second determining unit 4016.

The second decision unit 4014 can be configured to determine whether the IMU exits the steady state.

The second collecting unit 4015 can be configured to collect the second 3D position information and the second IMU information of the position object when the IMU exits the steady state. The second 3D position information is a 3D position information of the position object, wherein the 3D position information is collected by the position device when the IMU exits the steady state. The second IMU information is an information collected by the IMU when the IMU exits the steady state.

The second determining unit 4016 can be configured to determine the second 3D position based on the second 3D position information.

The second determining unit 4016 can be further configured to determine the second IMU calculation 3D position based on the second IMU information.

The first determining module 403 may further include a third decision unit 4031 and a third determining unit 4032.

The third decision unit 4031 can be configured to determine whether the first relative vector is less than the fourth preset threshold and determine whether the second relative vector is less than the fifth preset threshold.

The third determining unit 4032 can be configured to determine that the first relative vector and the second relative vector meet a preset condition when the length of the first relative vector is greater than the fourth preset threshold and the length of the second relative vector is greater than the fifth preset threshold.

In conclusion, it can be seen that the rotation matrix is determined by applying the rigid matching algorithm to all the target vector pairs in the target buffer. The rotation matrix can ensure that the position device and the IMU are arranged in a same orientation and along a same direction. That is, the position device can be aligned with the IMU without hardware and only by a procedure. Therefore, the hardware process requirements are lowered. Furthermore, because the rotation matrix is obtained based on the 3D position and the IMU calculation 3D position of the position object when the IMU enters the steady state and exits the steady state, in addition, because the target vector pairs are determined by applying vector normalization process to the first relative vector and the second relative vector of one position object, and the target vector pairs are stored in the target buffer. When the number of the target vector pairs in the target buffer is greater than the preset value, the rigid matching algorithm is applied to all the target vector pairs in the target buffer to determine the rotation matrix. Therefore, only one position object is needed, and there is no need to provide multiple position objects binding to each other, which reduces the hardware process requirements and cost.

A person skilled in the art can clearly understand that for the convenience and brevity of the description, the specific working process of the system, the device and the unit described above can refer to the corresponding process in the foregoing method embodiment, and details are not described herein again.

In the several embodiments provided in the present disclosure, it should be understood that the system, apparatus, and method may be implemented in other manners. For example, the devices of the embodiments described above are merely illustrative. For example, the division of the unit/module/device is only a logical function division. In actual implementation, there may be another division manner. For example, multiple units, or modules or components may be integrated or may be integrated into another system or device, or some features can be ignored or not executed. In addition, the coupling or direct coupling or communication connection illustrated or discussed may be an indirect connection or a communication connection via a certain interface, device, and/or unit, and may be electrical, mechanical or otherwise.

The units described as separate components may or may not be physical separated, and the components illustrated as units may or may not be physical units. In other words, the components illustrated as units may be located in one unit, or may be distributed to multiple units coupled to each other. Some or all the of the units may be selected based on actual needs to achieve the purpose of the solution of the embodiment.

In addition, each of the functional units in each embodiment of the present disclosure may be integrated into one processing unit o processor, or each of the functional units may exist physically and separately, or two or more functional units may be integrated into one unit or processor. The above integrated unit or processor can be implemented in the form of hardware or in the form of a software functional unit.

The integrated unit, if implemented in the form of a software functional unit and hardware or configured as a standalone product, may be stored in a computer readable storage medium. Based on such understanding, the technical solution of the present disclosure, in essence or in part, or all of or part of the technical solutions may be embodied in the form of a software product stored in a storage medium. A number of instructions are included to enable a computer device (which may be a personal computer, server, or network device, etc.) to perform all the or part of the blocks of the methods described in various embodiments of the present disclosure. The foregoing storage medium may include: a U disk, a mobile hard disk, a read-only memory (ROM), a random-access memory (RAM), a magnetic disk, or an optical disk, and the like, which can store program code. In some embodiments, the storage medium or the memory can be disposed in an electronic device, or can be integrated with the electronic device. Such that the electronic device can be configured to store the program code.

The above embodiments are only configured to illustrate the technical solutions of the present disclosure, and are not intended to be limiting. Although the present disclosure has been described in detail with reference to the foregoing embodiments, those skilled in the art will understand that the technical solutions described in the embodiments may be modified, or the equivalents of the technical features may be replaced by the equivalents of the technical solutions of the embodiments of the present disclosure.

What is claimed is:

1. An alignment method, comprising:
   determining a first 3D (three dimensional) position and a first inertial measurement unit (IMU)_calculation 3D position of a position object with an IMU when the IMU enters a steady state;
   determining a second 3D position and a second IMU calculation 3D position of the position object when the IMU exits the steady state; wherein the first 3D position and the second 3D position are determined by a position device, the first IMU calculation 3D position and the second IMU calculation 3D position are determined by the IMU;
   determining a first relative vector based on the first 3D position and the second 3D position; determining a second relative vector based on the first IMU calculation 3D position and the second IMU calculation 3D position;
   determining a rotation matrix based on the first relative vector and the second first relative vector; and
   aligning a coordinate system of the position device with a coordinate system of the IMU based on the rotation matrix.

2. The method as claimed in claim 1, wherein the first 3D position is a 3D position of the position object based on a 3D position information of the position object collected by the position device when the IMU enters the steady state; the second 3D position is a 3D position of the position object based on a 3D position information of the position object collected by the position device when the IMU exits the steady state.

3. The method as claimed in claim 1, wherein the first IMU calculation 3D position is a 3D position of the position object based on an IMU information of the position object collected by the IMU when the IMU enters into the steady state; the second IMU calculation 3D position is a 3D position of the position object based on an IMU information of the position object collected by the IMU when the IMU exits the steady state.

4. The method as claimed in claim 1, wherein the first relative vector is a vector between the first 3D position and the second 3D position; the second relative vector is a vector between the first IMU calculation 3D position and the second IMU calculation 3D position.

5. The method as claimed in claim 1, wherein determining the first 3D and the first IMU calculation 3D position of the position object comprises:
  determining whether the IMU enters the steady state; and
  collecting a first 3D position information and a first IMU information of the position object when the IMU enters the steady state, wherein the first 3D position information is a 3D position information of the position object collected by the position device when the IMU enters the steady state; the first IMU information is an information collected by the IMU when the IMU enters the steady state;
  wherein the first 3D position is determined based on the first 3D position information; the first IMU calculation 3D position is determined based on the first IMU information.

6. The method as claimed in claim 5, wherein:
  the IMU is considered to enter the steady state when a difference between two yaw values of the IMU of any two frames is less than a first preset threshold; and/or
  the IMU is considered to enter the steady state when a difference between two pitch values of the IMU of any two frames is less than a second preset threshold; and/or
  the IMU is considered to enter the steady state when a difference between two roll values of the IMU of any two frames is less than a third preset threshold.

7. The method as claimed in claim 1, further comprising:
  after determining the first relative vector and the second relative vector, determining a plurality of target vector pairs by applying a vector normalization process to the first relative vector and the second relative vector when the first relative vector and the second relative vector meet a preset condition;
  wherein the rotation matrix is determined based on the target vector pairs.

8. The method as claimed in claim 7, further comprising:
  after determining the target vector pairs, storing the target vector pairs in a target buffer;
  wherein the rotation matrix is determined by applying a rigid matching algorithm to the target vector pairs in the target buffer when an amount of the target vector pairs in the target buffer is greater than a preset value.

9. The method as claimed in claim 7, wherein the first relative vector and the second relative vector are considered to meet the preset condition when a length of the first relative vector is greater than a fourth preset threshold and a length of the second relative vector is greater than a fifth preset threshold.

10. The method as claimed in claim 1, wherein determining the second 3D position and the second IMU calculation 3D position of the position object comprises:
  determining whether the IMU exits the steady state; and
  collecting a second 3D position information and a second IMU information of the position object when the IMU exits the steady state, wherein the second 3D position information is a 3D position information of the position object collected by the position device when the IMU exits the steady state; the second IMU information is an information collected by the IMU when the IMU exits the steady state;
  wherein the second 3D position is determined based on the second 3D position information; the second IMU calculation 3D position is determined based on the second IMU information.

11. An electronic device, comprising:
  one or more processors; and
  memory storing one or more programs configured to be executed by the one or more processors, the one or more programs comprising instructions for:
    determining a first 3D (three dimensional) position and a first inertial measurement unit (IMU) calculation 3D position of a position object with an IMU when the IMU enters a steady state;
    determining a second 3D position and a second IMU calculation 3D position of the position object when the IMU exits the steady state; wherein the first 3D position and the second 3D position are determined by a position device; the first IMU calculation 3D position and the second IMU calculation 3D position are determined by the IMU;
    determining a first relative vector based on the first 3D position and the second 3D position;
    determining a second relative vector based on the first IMU calculation 3D position and the second IMU calculation 3D position;
    determining a rotation matrix based on the first relative vector and the second first relative vector; and
    aligning a coordinate system of the position device with a coordinate system of the IMU based on the rotation matrix.

12. The electronic device as claimed in claim 11, wherein one or more programs further comprise instructions for:
  acquiring a difference between two yaw values of the IMU of any two frames; the IMU is considered to enter the steady state when the difference between two yaw values of the IMU of any two frames is less than a first preset threshold; and/or
  acquiring a difference between two pitch values of the IMU of any two frames; the IMU is considered to enter the steady state when the difference between two pitch values of the IMU of any two frames is less than a second preset threshold; and/or
  acquiring a difference between two roll values of the IMU of any two frames; the IMU is considered to enter the steady state when the difference between two roll values of the IMU of any two frames is less than a third preset threshold.

13. The electronic device as claimed in claim 11, wherein the first relative vector is a vector between the first 3D position and the second 3D position; the second relative vector is a vector between the first IMU calculation 3D position and the second IMU calculation 3D position.

14. The electronic device as claimed in claim 11, wherein after determining the first relative vector and the second relative vector, the one or more programs further comprise instructions for:
  determining a plurality of target vector pairs by applying a vector normalization process to the first relative vector and the second relative vector when a length of the first relative vector is greater than a fourth preset threshold and a length of the second relative vector is greater than a fifth preset threshold;

wherein the rotation matrix is determined based on the target vector pairs.

15. The electronic device as claimed in claim 14, wherein the one or more programs further comprise instructions for:
storing the target vector pairs in a target buffer; and
determining the rotation matrix by applying a rigid matching algorithm to all the target vector pairs in the target buffer when an amount of the target vector pairs in the target buffer is greater than a preset value.

16. A non-transitory computer readable storage medium storing one or more programs configured to be executed by one or more processors of an electronic device, the one or more programs comprising instruction for:
determining a first 3D (three dimensional) position and a first inertial measurement unit (IMU) calculation 3D position of a position object with an IMU when the IMU enters a steady state;
determining a second 3D position and a second IMU calculation 3D position of the position object when the IMU exits the steady state; wherein the first 3D position and the second 3D position are determined by a position device; the first IMU calculation 3D position and the second IMU calculation 3D position are determined by the IMU;
determining a first relative vector based on the first 3D position and the second 3D position;
determining a second relative vector based on the first IMU calculation 3D position and the second IMU calculation 3D position;
determining a rotation matrix based on the first relative vector and the second first relative vector; and
aligning a coordinate system of the position device with a coordinate system of the IMU based on the rotation matrix.

17. The non-transitory computer readable storage medium as claimed in claim 16, wherein the first relative vector is a vector between the first 3D position and the second 3D position; the second relative vector is a vector between the first IMU calculation 3D position and the second IMU calculation 3D position.

18. The non-transitory computer readable storage medium as claimed in claim 16, wherein one or more programs further comprise instructions for:
acquiring a difference between two yaw values of the IMU of any two frames; the IMU is considered to enter the steady state when the difference between two yaw values of the IMU of any two frames is less than a first preset threshold; and/or
acquiring a difference between two pitch values of the IMU of any two frames; the IMU is considered to enter the steady state when the difference between two pitch values of the IMU of any two frames is less than a second preset threshold; and/or
acquiring a difference between two roll values of the IMU of any two frames; the IMU is considered to enter the steady state when the difference between two roll values of the IMU of any two frames is less than a third preset threshold.

19. The non-transitory computer readable storage medium as claimed in claim 16, wherein after determining the first relative vector and the second relative vector, the one or more programs further comprise instructions for:
determining a plurality of target vector pairs by applying a vector normalization process to the first relative vector and the second relative vector when a length of the first relative vector is greater than a fourth preset threshold and a length of the second relative vector is greater than a fifth preset threshold;
wherein the rotation matrix is determined based on the target vector pairs.

20. The non-transitory computer readable storage medium as claimed in claim 19, wherein the one or more programs further comprise instructions for:
storing the target vector pairs in a target buffer; and
determining the rotation matrix by applying a rigid matching algorithm to all the target vector pairs in the target buffer when an amount of the target vector pairs in the target buffer is greater than a preset value.

* * * * *